(Model.)
D. R. SHRIVER.
CHURN DASHER.
No. 285,694. Patented Sept. 25, 1883.
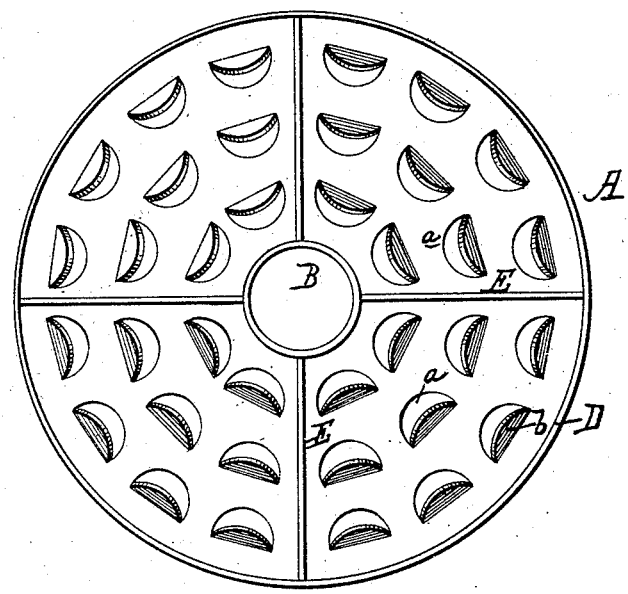
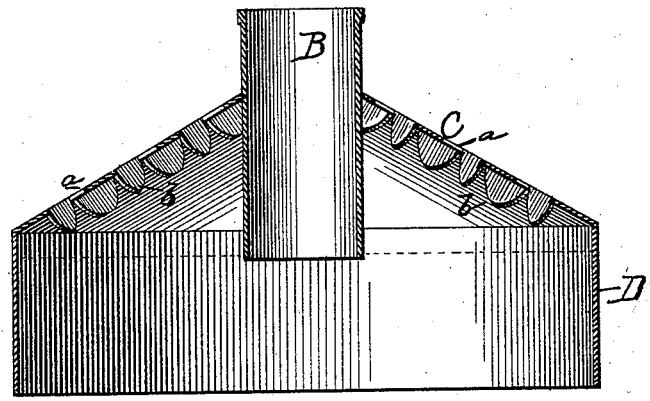
Witnesses:
Henry Collins
Dudley Phillips
Inventor:
Daniel R. Shriver
George E. Lemon Atty.

UNITED STATES PATENT OFFICE.

DANIEL R. SHRIVER, OF MANCHESTER, OHIO.

CHURN-DASHER.

SPECIFICATION forming part of Letters Patent No. 285,694, dated September 25, 1883.

Application filed March 3, 1882. (Model.)

*To all whom it may concern:*

Be it known that I, DANIEL R. SHRIVER, a citizen of the United States, residing at Manchester, in the county of Adams and State of Ohio, have invented a new and useful Improvement in Churn-Dashers; and I do hereby declare that the following is a full, clear, and exact description of the invention, which will enable others skilled in the art to which it appertains to make and use the same.

This invention relates to certain new and useful improvements in reciprocating churn-dashers; and it has for its object to provide a churn-dasher which will effectively and readily agitate the cream and lessen the labor of churning; and it consists in the particular construction of the dasher and the combination of the parts constituting the same, as will be hereinafter set forth, and pointed out in the claim.

In the annexed drawings, which illustrate my invention, Figure I is a bottom view of the churn-dasher, and Fig. II is a transverse section.

A represents the churn-dasher, which is provided with a circular socket, B, which extends slightly above the apex of the conical side C. This socket provides the means whereby the dasher, to be hereinafter described, can be readily attached to the handle. The conical side or upper portion of the churn-dasher is provided with semicircular perforations $a$, the metal which is cut from said semicircular portion of the perforations being upset or bent downwardly, as shown at $b$. Attached to the base of this cone is a vertical side wall, D, which extends downwardly below the socket B for the reception of the handle. Attached to the inner side of this vertical wall or side are partitions E, which serve further to strengthen and give rigidity to the dasher.

The operation of this improved churn-dasher is as follows: When the same is reciprocated vertically, after the manner of an ordinary dasher, the cream is gathered within the vertical walls D, and when the same is forced downward the cream is forced against the downward projections $b$ and out through the perforations $a$. By this means the globules of milk are rapidly disintegrated and the butter readily formed.

I am aware that prior to my invention rotary dashers have been provided with perforations the metal of which is bent downwardly, so as to form projections against which the milk comes when the same is rotated; also, reciprocating dashers have been provided in which the upper part has been perforated; but in this case the downward projections $b$ and the side walls below the same are not shown. The advantage of providing the churn-dasher with these additional elements is obvious, as the side walls hold the milk and prevent it from being thrown away from the dasher instead of against the downward projections and through the perforations.

I am aware that it is not new to provide a churn-dasher with perforations in the upper part of the same; nor is it new to provide a reciprocating churn-dasher with downwardly-projecting flanges having intervening open spaces, and I do not claim such construction broadly.

Having thus described my invention, what I claim as new, and desire to secure by Letters Patent, is—

In a vertically-reciprocating churn-dasher, the handle-socket B, having attached thereto conical top C, provided with the semicircular openings $a$ and projections $b$, said top C and handle-socket B having vertical outer wall, D, and transverse partitions E, the parts being organized substantially as shown, and for the purpose set forth.

DANIEL R. SHRIVER.

Witnesses:
DUDLEY PHILLIPS,
MICHAEL O'NEIL, Jr.